United States Patent
Ohtomo et al.

(10) Patent No.: US 10,851,207 B2
(45) Date of Patent: *Dec. 1, 2020

(54) AROMATIC POLYSULFONE, PREPREG, AND METHOD FOR PRODUCING PREPREG

(71) Applicant: Sumitomo Chemical Company, Limited, Tokyo (JP)

(72) Inventors: Shinji Ohtomo, Tsukuba (JP); Masanobu Matsubara, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/074,826

(22) PCT Filed: Feb. 2, 2017

(86) PCT No.: PCT/JP2017/003821
§ 371 (c)(1),
(2) Date: Aug. 2, 2018

(87) PCT Pub. No.: WO2017/135379
PCT Pub. Date: Aug. 10, 2017

(65) Prior Publication Data
US 2019/0040203 A1    Feb. 7, 2019

(30) Foreign Application Priority Data

Feb. 5, 2016  (JP) ................. 2016-021123
Sep. 15, 2016 (JP) ................. 2016-180849

(51) Int. Cl.
| C08G 75/20 | (2016.01) |
| C08J 5/24 | (2006.01) |
| C08G 75/23 | (2006.01) |
| C08J 5/04 | (2006.01) |

(52) U.S. Cl.
CPC .......... C08G 75/20 (2013.01); C08G 75/23 (2013.01); C08J 5/04 (2013.01); C08J 5/24 (2013.01); *C08J 2363/00* (2013.01); *C08J 2381/06* (2013.01); *C08J 2463/00* (2013.01); *C08J 2481/06* (2013.01)

(58) Field of Classification Search
CPC ....... C08J 2381/06; C08J 5/18; C08G 75/205; C08G 75/23; C08G 65/40; G01N 2030/486; C08L 81/06
See application file for complete search history.

(56) References Cited

U.S. PATENT DOCUMENTS

| 5,212,278 | A | 5/1993 | Pfaendner et al. |
| 6,437,080 | B1 | 8/2002 | McGrail et al. |
| 9,587,112 | B2 | 3/2017 | Kohinata et al. |
| 2012/0190764 | A1 | 7/2012 | Kohinata et al. |
| 2014/0057515 | A1 | 2/2014 | Suzuki et al. |
| 2015/0274911 | A1 | 10/2015 | Suzuki et al. |
| 2017/0022322 | A1 | 1/2017 | Louis et al. |
| 2018/0057636 | A1 | 3/2018 | Ohtomo et al. |
| 2019/0071542 | A1 | 3/2019 | Ohtomo et al. |

FOREIGN PATENT DOCUMENTS

| CN | 1040788 A | 3/1990 |
| CN | 103347939 A | 10/2013 |
| EP | 2189487 A1 | 5/2010 |
| EP | 3412702 A1 | 12/2018 |
| JP | H05117527 A | 5/1993 |
| JP | H10338745 A | 12/1998 |
| JP | 2002172675 A | 6/2002 |
| JP | 2010077185 A | 4/2010 |
| JP | 2011094111 A | 5/2011 |

(Continued)

OTHER PUBLICATIONS

Int'l Search Report dated Apr. 4, 2017 in Int'l Application No. PCT/JP2017/003821.

(Continued)

*Primary Examiner* — Shane Fang
(74) *Attorney, Agent, or Firm* — Panitch Schwarze Belisario & Nadel LLP

(57) ABSTRACT

A thermoplastic aromatic polysulfone is obtained by polymerizing a dihalogeno compound (A) and a dihydric phenol (B). The ratio (Mw/Mn) between a number average molecular weight (Mn) and a weight average molecular weight (Mw) is at least 1.80 and less than 1.90, and the number average molecular weight (Mn) is at least 6,000 and less than 14,000.

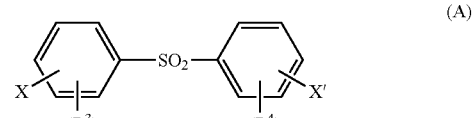

(A)

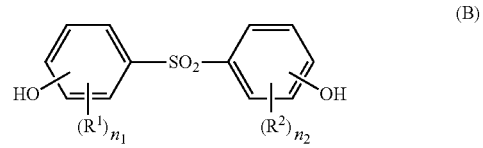

(B)

In (A) and (B), each of X and X' independently represents a halogen atom; each of $R^1$, $R^2$, $R^3$ and $R^4$ independently represents an alkyl group having 1 to 4 carbon atoms or an alkoxy group having 1 to 4 carbon atoms; each of $n_1$, $n_2$, $n_3$ and $n_4$ independently represents an integer of 0 to 4; and when $n_1$, $n_2$, $n_3$ or $n_4$ is an integer of 2 to 4, a plurality of $R^1$, $R^2$, $R^3$ or $R^4$ groups may be the same or different from each other.

5 Claims, No Drawings

(56) References Cited

FOREIGN PATENT DOCUMENTS

| JP | 2012067216 A | 4/2012 |
|---|---|---|
| JP | 2012196921 A | 10/2012 |
| JP | 2013253211 A | 12/2013 |
| JP | 5703645 B2 | 4/2015 |
| JP | 2015078310 A | 4/2015 |
| WO | 2014050896 A1 | 4/2014 |
| WO | 2016148133 A1 | 9/2016 |
| WO | 2017135376 A1 | 8/2017 |

OTHER PUBLICATIONS

Extended European Search Report dated Jul. 29, 2019 in EP Application No. 17747530.8.
Office Action dated Apr. 28, 2010 in JP Application No. 2016180849 (with English Machine Translation).
Broadbelt et al., "Influence of Poly(arylether sulfone) Molecular Weight Distribution on Measures of Global Thermal Stability," Journal of Applied Polymer Science, vol. 58, No. 8, pp. 1325-1334 (1995).
Office Action dated Mar. 4, 2020 in CN Application No. 201780008754.3.
Office Action dated Apr. 9, 2020 in EP Application No. 17747530.8.
International Search Report dated Jun. 14, 2016 in International Application No. PCT/JP2016/058120.
Office Action dated Feb. 27, 2019 in CN Application No. 201680015552.7.
Office Action dated Jan. 18, 2019 in U.S. Appl. No. 15/556,703, by Ohtomo.
Office Action dated Jul. 21, 2020 in IN Application No. 201847030309.

AROMATIC POLYSULFONE, PREPREG, AND METHOD FOR PRODUCING PREPREG

CROSS-REFERENCE TO RELATED APPLICATION

This application is a Section 371 of International Application No. PCT/JP2017/003821, filed Feb. 2, 2017, which was published in the Japanese language on Aug. 10, 2017 under International Publication No. WO 2017/135379 A1, the disclosure of which is incorporated herein by reference in its entirety.

TECHNICAL FIELD

The present invention relates to an aromatic polysulfone, a prepreg and a method for producing a prepreg.

Priority is claimed on Japanese Patent Application No. 2016-021123, filed Feb. 5, 2016, and Japanese Patent Application No. 2016-180849, filed Sep. 15, 2016, the contents of which are incorporated herein by reference.

BACKGROUND ART

Aromatic polysulfones have been used as various coating materials since they are not only excellent in heat resistance, chemical resistance, creep resistance and the like, but also exhibit favorable adhesion to materials such as metals, glass and ceramics. As an example of such a utilization method, a method of forming a coating film of a fluororesin on the surface of a substrate by applying an aromatic polysulfone solution containing a fluororesin to a metal substrate, followed by a heat treatment has been known.

In order for the aromatic polysulfones to exhibit heat resistance suitable for such use, it is important that the molecular weight and the molecular weight distribution thereof are within appropriate ranges, and for example, an aromatic polysulfone having a number average molecular weight (Mn) of 11,000 to 25,000 and a polydispersity (Mw/Mn) of 3.0 or less has been known (see Patent Document 1).

CITATION LIST

Patent Document

[Patent Document 1] Japanese Unexamined Patent Application, First Publication No. 2002-172675

SUMMARY OF INVENTION

Technical Problem

Since the aromatic polysulfones have high glass transition temperatures (Tg), they are used as materials excellent in heat resistance in a number of fields including the field of electronic materials.

However, it is desired to further improve the heat resistance of these aromatic polysulfones, and there is still room for improvement in order to exhibit high glass transition temperatures (Tg).

When manufacturing an electronic device, components of the electronic device are sometimes exposed to high temperatures, as in the reflow process, for example. In order to suppress the deformation of components, the exhibition of high glass transition temperatures (Tg) is required. Further, in addition to the electronic devices, similar problems may arise for members exposed to high temperature conditions.

The present invention has been made in view of such circumstances, with an object of providing a novel aromatic polysulfone capable of exhibiting a high glass transition temperature (Tg), a prepreg using the aromatic polysulfone, and a method for producing the prepreg.

Solution to Problem

In order to solve the above problems, a first aspect of the present invention provides an aromatic polysulfone which is a thermoplastic aromatic polysulfone obtained by polymerizing a dihalogeno compound (A) represented by a formula (A) and a dihydric phenol (B) represented by a formula (B), wherein a value of a ratio (Mw/Mn) between the number average molecular weight (Mn) and the weight average molecular weight (Mw) is at least 1.80 and less than 1.90, and the number average molecular weight (Mn) is at least 6,000 and less than 14,000.

[Chemical Formula 1]

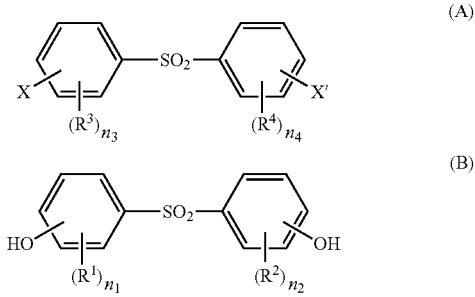

[In the formulas (A) and (B), each of X and X' independently represents a halogen atom;

each of $R^1$, $R^2$, $R^3$ and $R^4$ independently represents an alkyl group having 1 to 4 carbon atoms or an alkoxy group having 1 to 4 carbon atoms; each of $n_1$, $n_2$, $n_3$ and $n_4$ independently represents an integer of 0 to 4; and when $n_1$, $n_2$, $n_3$ or $n_4$ is an integer of 2 to 4, a plurality of $R^1$, $R^2$, $R^3$ or $R^4$ groups may be the same or different from each other.]

A second aspect of the present invention is a prepreg using the aromatic polysulfone of the first aspect of the present invention, a liquid epoxy resin, a curing agent and a reinforcing fiber.

A third aspect of the present invention is a method for producing a prepreg, including a step of impregnating a mixture obtained by mixing the aromatic polysulfone of the first aspect of the present invention, a liquid epoxy resin and a curing agent with a reinforcing fiber.

That is, the present invention includes the following aspects.

[1] An aromatic polysulfone which is a thermoplastic aromatic polysulfone obtained by polymerizing a dihalogeno compound (A) represented by a formula (A) and a dihydric phenol (B) represented by a formula (B), wherein a value of a ratio (Mw/Mn) between a number average molecular weight (Mn) and a weight average molecular weight (Mw) is at least 1.80 and less than 1.90, and the number average molecular weight (Mn) is at least 6,000 and less than 14,000,

[Chemical Formula 2]

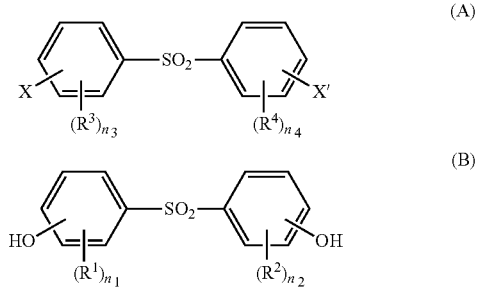

[wherein in the formulas (A) and (B), each of X and X' independently represents a halogen atom;

each of $R^1$, $R^2$, $R^3$ and $R^4$ independently represents an alkyl group having 1 to 4 carbon atoms or an alkoxy group having 1 to 4 carbon atoms;

each of $n_1$, $n_2$, $n_3$ and $n_4$ independently represents an integer of 0 to 4; and when $n_1$, $n_2$, $n_3$ or $n_4$ is an integer of 2 to 4, a plurality of $R^1$, $R^2$, $R^3$ or $R^4$ groups may be the same or different from each other.]

[2] The aromatic polysulfone according to [1], wherein in the aforementioned formula (A), X and X' are chlorine atoms.

[3] The aromatic polysulfone according to [1] or [2], wherein in the aforementioned formula (A) or the aforementioned formula (B), $n_1$, $n_2$, $n_3$ and $n_4$ are 0.

[4] A prepreg formed from the aromatic polysulfone according to any one of [1] to [3], a liquid epoxy resin, a curing agent and a reinforcing fiber.

[5] A method for producing a prepreg, including a step of impregnating a mixture obtained by mixing the aromatic polysulfone according to any one of [1] to [3], a liquid epoxy resin and a curing agent with a reinforcing fiber.

Advantageous Effects of Invention

According to the present invention, it is possible to provide a novel aromatic polysulfone capable of exhibiting a high glass transition temperature (Tg), a prepreg using the aromatic polysulfone, and a method for producing the prepreg.

DESCRIPTION OF EMBODIMENTS

<Aromatic Polysulfone>

An aromatic polysulfone of the present invention is a thermoplastic aromatic polysulfone obtained by polymerizing a dihalogeno compound (A) represented by the following formula (A) and a dihydric phenol (B) represented by the following formula (B), and is an aromatic polysulfone in which a value of a ratio (Mw/Mn, that is, polydispersity) between the number average molecular weight (Mn) and the weight average molecular weight (Mw) is at least 1.80 and less than 1.90, and the number average molecular weight (Mn) is at least 6,000 and less than 14,000.

Another aspect of the aromatic polysulfone of the present invention is a thermoplastic aromatic polysulfone in which the dihalogeno compound (A) represented by the following formula (A) and the dihydric phenol (B) represented by the following formula (B) are polymerized, a value of the ratio (Mw/Mn) between the number average molecular weight (Mn) and the weight average molecular weight (Mw) is at least 1.80 and less than 1.90, and the number average molecular weight (Mn) is at least 6,000 and less than 14,000.

Yet another aspect of the aromatic polysulfone of the present invention is a thermoplastic aromatic polysulfone including a structural unit derived from the dihalogeno compound (A) represented by the following formula (A) and a structural unit derived from the dihydric phenol (B) represented by the following formula (B), and in which a value of the ratio (Mw/Mn) between the number average molecular weight (Mn) and the weight average molecular weight (Mw) is at least 1.80 and less than 1.90, and the number average molecular weight (Mn) is at least 6,000 and less than 14,000. Here, the expression "derived" means that the chemical structure is changed because the dihalogeno compound (A) and the dihydric phenol (B) are polymerized. In the present specification, the dihalogeno compound (A) represented by the formula (A) may be simply referred to as "dihalogeno compound (A)". Further, the dihydric phenol (B) represented by the formula (B) may be simply referred to as "dihydric phenol (B)".

The aromatic polysulfone of the present invention can exhibit a high glass transition temperature and exhibits excellent heat resistance because the dihalogeno compound (A) and the dihydric phenol (B) are used as monomers, and the values of Mw/Mn and Mn satisfy the above conditions.

[Chemical Formula 3]

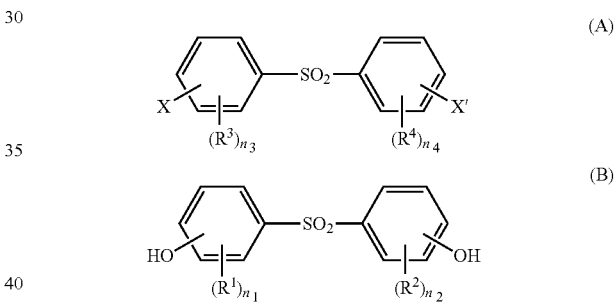

[In the formulas (A) and (B), each of X and X' independently represents a halogen atom;

each of $R^1$, $R^2$, $R^3$ and $R^4$ independently represents an alkyl group having 1 to 4 carbon atoms or an alkoxy group having 1 to 4 carbon atoms;

each of $n_1$, $n_2$, $n_3$ and $n_4$ independently represents an integer of 0 to 4; and when $n_1$, $n_2$, $n_3$ or $n_4$ is an integer of 2 to 4, a plurality of $R^1$, $R^2$, $R^3$ or $R^4$ groups may be the same or different from each other.]

[Dihalogeno Compound (A)]

The dihalogeno compound (A) is a compound represented by the formula (A).

In the formula (A), each of X and X' independently represents a halogen atom. Examples of the halogen atom include a chlorine atom, a bromine atom and an iodine atom, but it is preferably a chlorine atom.

When the position number of the carbon atom to which the sulfonyl group (—$SO_2$—) of the benzene ring skeleton is bonded is taken as the 1st position, each of X and X' may be bonded to any of the carbon atoms at the 2nd, 3rd and 4th positions of the benzene ring skeleton, but it is preferably bonded to the carbon atom at the 4th position. That is, the dihalogeno compound (A) is preferably bis(4-chlorophenyl) sulfone to which either one or both of $R^3$ and $R^4$ may be bonded instead of a hydrogen atom.

In the formula (A), each of $R^3$ and $R^4$ independently represents an alkyl group having 1 to 4 carbon atoms or an alkoxy group having 1 to 4 carbon atoms.

The alkyl group represented by $R^3$ and $R^4$ may be any of linear, branched and cyclic, but is preferably linear or branched, and examples thereof include a methyl group, an ethyl group, an n-propyl group, an isopropyl group, an n-butyl group, an isobutyl group, a sec-butyl group, and a tert-butyl group.

The alkoxy group represented by $R^3$ and $R^4$ may be any of linear, branched and cyclic, but is preferably linear or branched, and examples thereof include a methoxy group, an ethoxy group, an n-propoxy group, an isopropoxy group, an n-butoxy group, an isobutoxy group, a sec-butoxy group, and a tert-butoxy group.

In the formula (A), $n_3$ is the number of bonds of $R^3$ and $n_4$ is the number of bonds of $R^4$, and each of them independently represents an integer of 0 to 4.

When $n_3$ and $n_4$ are other than 0, the bonding position of the corresponding $R^3$ or $R^4$ is not particularly limited. When the position number of the carbon atom to which the sulfonyl group of the benzene ring skeleton is bonded is taken as the 1st position, $R^3$ or $R^4$ may be bonded to any carbon atoms at the 2nd, 3rd, 4th, 5th and 6th positions of the benzene ring skeleton, provided that the carbon atom to which X or X' is bonded is excluded as the bonding position of $R^3$ or $R^4$. $R^3$ or $R^4$ is preferably bonded to a carbon atom other than that at the 4th position, and more preferably bonded to the carbon atom at the 3rd or 5th position, or the 3rd and 5th positions.

When $n_3$ or $n_4$ is an integer of 2 to 4, a plurality of $R^3$ or $R^4$ groups may be the same or different from each other. For example, when $n_3$ is an integer of 2 to 4, all of $n_3$ $R^3$ groups may be the same or different from each other, and when $n_3$ is 3 or 4, only some of them may be the same. The same also applies for $n_4$ $R^4$ groups as in the case of $n_3$ $R^3$ groups.

Each of $n_3$ and $n_4$ preferably independently represents an integer of 0 to 3, more preferably an integer of 0 to 2, and still more preferably 0 or 1.

As an example of a preferred dihalogeno compound (A), bis(4-chlorophenyl) sulfone can be mentioned. Bis(4-chlorophenyl) sulfone is also referred to as 4,4'-dichlorodiphenyl sulfone.

[Dihydric Phenol (B)]

The dihydric phenol (B) is a compound represented by the formula (B).

In the dihydric phenol (B), when the position number of the carbon atom to which the sulfonyl group of the benzene ring skeleton is bonded is taken as the 1st position, each of two hydroxy groups (—OH) may be bonded to any of the carbon atoms at the 2nd, 3rd and 4th positions of the benzene ring skeleton, but it is preferably bonded to the carbon atom at the 4th position. That is, the dihydric phenol (B) is preferably bis(4-hydroxyphenyl) sulfone to which either one or both of $R^1$ and $R^2$ may be bonded instead of a hydrogen atom. Bis(4-hydroxyphenyl) sulfone is also referred to as 4,4'-dihydroxydiphenyl sulfone.

In the formula (B), each of $R^1$ and $R^2$ independently represents an alkyl group having 1 to 4 carbon atoms or an alkoxy group having 1 to 4 carbon atoms. Examples of the alkyl group having 1 to 4 carbon atoms and the alkoxy group having 1 to 4 carbon atoms represented by $R^1$ and $R^2$ include the same groups as those mentioned in the description of $R^3$ and $R^4$.

Further, $n_1$ is the number of bonds of $R^1$ and $n_2$ is the number of bonds of $R^2$, and each of them independently represents an integer of 0 to 4. When $n_1$ and $n_2$ are other than 0, the bonding position of the corresponding $R^1$ or $R^2$ is not particularly limited. When the position number of the carbon atom to which the sulfonyl group of the benzene ring skeleton is bonded is taken as the 1st position, $R^1$ or $R^2$ may be bonded to any carbon atoms at the 2nd, 3rd, 4th, 5th and 6th positions of the benzene ring skeleton, provided that the carbon atom to which the hydroxy group is bonded is excluded as the bonding position of $R^1$ or $R^2$. $R^1$ or $R^2$ is preferably bonded to a carbon atom other than that at the 4th position, and is preferably bonded to the carbon atom at the 3rd or 5th position, or the 3rd and 5th positions.

When $n_1$ or $n_2$ is an integer of 2 to 4, a plurality of $R^1$ or $R^2$ groups may be the same or different from each other. For example, when $n_1$ is an integer of 2 to 4, all of $n_1$ $R^1$ groups may be the same or different from each other, and when $n_1$ is 3 or 4, only some of the $R^1$ groups may be the same. The same also applies for $n_2$ $R^2$ groups as in the case of $n_1$ $R^1$ groups.

Each of $n_1$ and $n_2$ preferably independently represents an integer of 0 to 3, more preferably an integer of 0 to 2, and still more preferably 0 or 1.

As another aspect, bis(4-hydroxyphenyl) sulfone and bis(4-hydroxy-3,5-dimethylphenyl) sulfone are preferred as the dihydric phenol (B).

The reduced viscosity of the aromatic polysulfone of the present invention is preferably equal to or more than 0.18 dL/g, and more preferably from 0.22 to 0.28 dL/g. For the aromatic polysulfone, the higher the reduced viscosity, the easier the heat resistance, strength and rigidity are improved. On the other hand, when the reduced viscosity is too high (that is, when it exceeds the above upper limit value), the melting temperature and melt viscosity of the aromatic polysulfone tend to be high and the fluidity thereof tends to be low.

That is, when the reduced viscosity of the aromatic polysulfone of the present invention is within the above range, the heat resistance, strength and rigidity are easily improved, the melting temperature and melt viscosity do not become too high, and also the fluidity is difficult to decrease.

In the present specification, the reduced viscosity (dL/g) of aromatic polysulfone refers to a value determined by the following method. First, about 1 g of an aromatic polysulfone resin is precisely weighed and dissolved in N,N-dimethylformamide, and the volume of the resultant is set to 1 dL. Subsequently, the viscosity ($\eta$) of this solution and the viscosity ($\eta 0$) of N,N-dimethylformamide as a solvent are measured at 25° C. using an Ostwald type viscosity tube. Then, the reduced viscosity of the aromatic polysulfone is determined by dividing the specific viscosity (($\eta-\eta 0$)/$\eta 0$) obtained from the measured value by the concentration of the above solution (about 1 g/dL).

The number average molecular weight (Mn) of the aromatic polysulfone of the present invention is equal to or more than 6,000, preferably equal to or more than 6,500, more preferably equal to or more than 7,000, and still more preferably equal to or more than 7,500.

By ensuring that Mn is equal to or more than the above lower limit value, the aromatic polysulfone is remarkably excellent in heat resistance.

Further, the number average molecular weight (Mn) of the aromatic polysulfone of the present invention is less than 14,000, preferably equal to or less than 13,500, more preferably equal to or less than 13,000, still more preferably equal to or less than 12,500, still more preferably equal to or less than 12,000, and particularly preferably equal to or less than 11,500.

By ensuring that Mn is equal to or less than the above upper limit value, the aromatic polysulfone is remarkably excellent in heat resistance.

It should be noted that the upper limit value and the lower limit value of Mn described above can be arbitrarily combined.

The number average molecular weight (Mn) of the aromatic polysulfone of the present invention is, for example, at least 6,000 and less than 14,000, preferably 7,000 or more and 13,000 or less, more preferably 7,500 or more and 12,000 or less, still more preferably 7,500 or more and 11,500 or less, and particularly preferably from 8,000 to 11,000.

In the present specification, the value of Mw/Mn which is the ratio of the weight average molecular weight (Mw) to the number average molecular weight (Mn) of the aromatic polysulfone indicates the polydispersity of the aromatic polysulfone. In the aromatic polysulfone of the present invention, the value of Mw/Mn is at least 1.80 and less than 1.90, preferably at least 1.81, more preferably at least 1.82, and preferably 1.89 or less, more preferably 1.88 or less, and still more preferably 1.87 or less.

By ensuring that the value of Mw/Mn is equal to or more than the above lower limit value, the aromatic polysulfone can exhibit a high glass transition temperature.

The upper limit value and the lower limit value of Mw/Mn described above can be arbitrarily combined.

In the aromatic polysulfone of the present invention, it is particularly preferable that the value of Mw/Mn is, for example, 1.82 or more and 1.87 or less.

In the present specification, the weight average molecular weight (Mw) and the number average molecular weight (Mn) of the aromatic polysulfone are, for example, values obtained by averaging measured values that are measured twice by gel permeation chromatography (GPC) analysis. In each measurement, the molecular weight in terms of standard polystyrene is determined, based on the calibration curve obtained by measuring the molecular weight of standard polystyrene.

Further, the Mw/Mn value can be calculated from the weight average molecular weight (Mw) and the number average molecular weight (Mn) obtained as the average values as described above.

The aromatic polysulfone of the present invention can exhibit a high glass transition temperature. For example, when the glass transition temperature is calculated by a method according to JIS-K 7121, the glass transition temperature (° C.) of the aromatic polysulfone of the present invention is preferably 215° C. or higher, and more preferably 216° C. or higher. Further, the upper limit value of the glass transition temperature (° C.) is preferably 235° C. or lower. The glass transition temperature (° C.) is an indicator for evaluating the degree of heat resistance of the aromatic polysulfone, and it can be said that, in general, the higher the glass transition temperature, the more excellent the aromatic polysulfone is in heat resistance.

[Polymerization]

A step of reacting a dihalogeno compound (A) and a dihydric phenol (B) in a solvent (hereinafter referred to as "polymerization") will be described.

The polymerization (hereinafter also referred to as polycondensation) of the dihalogeno compound (A) and the dihydric phenol (B) is preferably carried out using an alkali metal salt of carbonic acid as a base, or in an organic solvent which is a polymerization solvent, and is more preferably carried out using an alkali metal salt of carbonic acid as a base and in an organic solvent.

The alkali metal salt of carbonic acid may be an alkali carbonate which is a normal salt, that is, an alkali metal carbonate, or an alkali bicarbonate which is an acid salt, that is, an alkali metal hydrogencarbonate or an alkali metal hydrogencarbonate, or it may be a mixture of an alkali carbonate and an alkali bicarbonate.

Preferable examples of the alkali carbonate include sodium carbonate, potassium carbonate and the like.

Preferable examples of the alkali bicarbonate include sodium bicarbonate (also referred to as sodium hydrogen carbonate), potassium bicarbonate (also referred to as potassium hydrogen carbonate), and the like.

It is preferable that the organic solvent is an organic polar solvent.

Examples of the organic polar solvent include dimethylsulfoxide, 1-methyl-2-pyrrolidone, sulfolane (also referred to as 1,1-dioxothiolane), 1,3-dimethyl-2-imidazolidinone, 1,3-diethyl-2-imidazolidinone, dimethyl sulfone, diethyl sulfone, diisopropyl sulfone and diphenyl sulfone.

The amount used of the dihalogeno compound (A) in the polymerization is preferably from 90 to 105 mol %, more preferably from 93 to 100 mol %, still more preferably from 95 to 100 mol %, and particularly preferably from 97 to 99 mol %, with respect to the amount (number of moles) used of the dihydric phenol (B). The desired reaction (polymerization) is a dehydrohalogenation polycondensation of the dihalogeno compound (A) and the dihydric phenol (B), and if the side reaction does not occur, the closer the molar ratio of both compounds gets to 1:1, that is, the closer the amount used of the dihalogeno compound (A) gets to 100 mol % with respect to the amount used of the dihydric phenol (B), the higher the degree of polymerization of the resulting aromatic polysulfone. As a result, there is a tendency with the aromatic polysulfone that the reduced viscosity increases, the Mn value increases, and the Mw/Mn value decreases. However, in fact, side reactions such as a substitution reaction of halogen atoms with hydroxy groups and depolymerization occur due to alkali hydroxides or the like generated as by-products, and the degree of polymerization of the obtained aromatic polysulfone is lowered by these side reactions. Therefore, also by taking the extent of these side reactions into consideration, it is necessary to adjust the amount used of the dihalogeno compound (A), so that an aromatic polysulfone having the predetermined reduced viscosity, Mn and Mw/Mn values can be obtained.

The amount used of the alkali metal salt of carbonic acid is, as the alkali metal, preferably from 90 to 110 mol %, more preferably from 95 to 105 mol %, still more preferably from 95 to 100 mol %, and particularly preferably from 97 to 99 mol %, with respect to the number of moles of the hydroxy group of the dihydric phenol (B). If the side reaction does not occur, since the intended polycondensation proceeds more rapidly as the amount used of the alkali metal salt of carbonic acid increases, the degree of polymerization of the obtained aromatic polysulfone becomes higher. As a result, there is a tendency with the aromatic polysulfone that the reduced viscosity increases, the Mn value increases, and the Mw/Mn value decreases. However, in fact, as the amount used of the alkali metal salt of carbonic acid is increased, side reactions similar to those described above are more likely to occur, and due to these side reactions, the degree of polymerization of the obtained aromatic polysulfone is lowered. Therefore, also by taking the extent of these side reactions into consideration, it is necessary to adjust the amount used of the alkali metal salt of carbonic acid, so that an aromatic polysulfone having the predetermined reduced viscosity, Mn and Mw/Mn values can be obtained.

In a typical method for producing an aromatic polysulfone, the dihalogeno compound (A) and the dihydric phenol (B) are dissolved in an organic polar solvent as a first stage; the dihalogeno compound (A) and the dihydric phenol (B) are polycondensed, as a second stage, by adding an alkali metal salt of carbonic acid to the solution obtained in the first stage; and as a third stage, from the reaction mixture obtained in the second stage, the unreacted alkali metal salt of carbonic acid, an alkali halide produced as a by-product and the organic polar solvent are removed to obtain an aromatic polysulfone.

The melting temperature in the first stage is preferably from 40 to 180° C. Further, the polycondensation temperature in the second stage is preferably from 180 to 400° C., more preferably from 300 to 400° C., and still more preferably more than 300° C. and 360° C. or less. If a side reaction does not occur, the higher the polycondensation temperature, the faster the intended polycondensation progresses, so that the degree of polymerization of the obtained aromatic polysulfone increases. As a result, there is a tendency with the aromatic polysulfone that the reduced viscosity increases, the Mn value increases, and the Mw/Mn value decreases. However, in fact, as the polycondensation temperature is increased, side reactions similar to those described above are more likely to occur, and due to these side reactions, the degree of polymerization of the obtained aromatic polysulfone is lowered. Therefore, also by taking the extent of these side reactions into consideration, it is necessary to adjust the polycondensation temperature, so that an aromatic polysulfone having the predetermined reduced viscosity, Mn and Mw/Mn values can be obtained.

In addition, the polycondensation in the second stage is usually preferably carried out by gradually raising the temperature while removing the water generated as a by-product, and after reaching the reflux temperature of the organic polar solvent, holding the temperature preferably for 1 to 50 hours, and more preferably 2 to 30 hours. If a side reaction does not occur, the longer the polycondensation time, the more the intended polycondensation progresses, so that the degree of polymerization of the obtained aromatic polysulfone increases. As a result, there is a tendency with the aromatic polysulfone that the reduced viscosity increases, the Mn value increases, and the Mw/Mn value decreases. However, in fact, as the polycondensation time is increased, side reactions similar to those described above are allowed to proceed, and due to these side reactions, the degree of polymerization of the obtained aromatic polysulfone is lowered. Therefore, also by taking the extent of these side reactions into consideration, it is necessary to adjust the polycondensation time, so that an aromatic polysulfone having the predetermined reduced viscosity, Mn and Mw/Mn values can be obtained.

In the third stage, first, the unreacted alkali metal salt of carbonic acid and the alkali halide generated as a by-product are removed from the reaction mixture obtained in the second stage by filtration, extraction, centrifugation or the like, whereby a solution in which an aromatic polysulfone is dissolved in an organic polar solvent is obtained. Subsequently, by removing the organic polar solvent from this solution, an aromatic polysulfone is obtained. Removal of the organic polar solvent may be carried out by distilling off the organic polar solvent directly from the solution, or may be carried out by mixing the solution with a poor solvent for the aromatic polysulfone to precipitate the aromatic polysulfone, followed by separation by filtration, centrifugation or the like.

As an example of a poor solvent for the aromatic polysulfone, methanol, ethanol, 2-propanol, hexane, heptane and water can be mentioned, and methanol is preferable since it is easy to remove.

Further, when an organic polar solvent having a relatively high melting point is used as a polymerization solvent, an aromatic polysulfone may be obtained by extracting and removing impurities such as the unreacted alkali metal salt of carbonic acid, the alkali halide generated as a by-product and the organic polar solvent from the reaction mixture obtained in the second stage. More specifically, an aromatic polysulfone may be obtained by cooling and solidifying the reaction mixture, followed by pulverization, and washing the obtained powder to thereby extract and remove impurities. In the washing process, it is preferable to first extract and remove the unreacted alkali metal salt of carbonic acid and the alkali halide produced as a by-product from the above powder with water, and at the same time, extract and remove the organic polar solvent using a solvent that does not dissolve the aromatic polysulfone, but dissolves (mixes uniformly with) the organic polar solvent. At that time, water used for extraction of the unreacted alkali metal salt of carbonic acid and the alkali halide produced as a by-product is preferably warm water.

Here, the temperature of the warm water used for extraction is preferably from 40 to 80° C.

The volume average particle diameter of the above powder is preferably from 200 to 2,000 μm, more preferably from 250 to 1,500 μm, and still more preferably from 300 to 1,000 μm from the viewpoints of extraction efficiency and workability at the time of extraction. By ensuring that the volume average particle diameter of the powder is equal to or more than the above lower limit value, solidification at the time of extraction and clogging at the time of filtering and drying after the extraction are highly suppressed. Further, by ensuring that the volume average particle diameter of the powder is equal to or less than the above upper limit value, the extraction efficiency is further enhanced.

In the present specification, the "volume average particle diameter" can be measured by a laser diffraction method.

As an example of the extraction solvent, for example, when diphenyl sulfone is used as a polymerization solvent, a mixed solvent of acetone and methanol and the like can be mentioned. Here, the mixing ratio of acetone and methanol is usually determined from the viewpoints of extraction efficiency and adherence of the aromatic polysulfone powder.

Further, in an alternative typical production method of an aromatic polysulfone which is different from the one described above, the dihydric phenol (B) and an alkali metal salt of carbonic acid are reacted in an organic polar solvent, and water generated as a by-product is removed as a first stage; the dihalogeno compound (A) is added to the reaction mixture obtained in the first stage to allow polycondensation to proceed as a second stage; and as a third stage, the unreacted alkali metal salt of carbonic acid, the alkali halide generated as a by-product and the organic polar solvent are removed from the reaction mixture obtained in the second stage to obtain an aromatic polysulfone, as in the case of the above-described method.

It should be noted that in this alternative method, azeotropic dehydration may be carried out by adding an organic solvent azeotropic with water in order to remove the water generated as a by-product in the first stage. Examples of organic solvents azeotropic with water include benzene, chlorobenzene, toluene, methyl isobutyl ketone, hexane and cyclohexane. The temperature of the azeotropic dehydration is preferably from 70 to 200° C.

Further, in this alternative method, the reaction temperature in the polycondensation of the second stage is usually from 180 to 400° C., preferably from 300 to 400° C., and more preferably more than 300° C. and 360° C. or less. Also in this alternative method, as in the case of the above-described method, by taking the extent of the side reactions into consideration, it is necessary to adjust the polycondensation temperature and the polycondensation time, so that an aromatic polysulfone having the predetermined reduced viscosity, Mn and Mw/Mn values can be obtained.

As described above, since the aromatic polysulfone of the present invention has a value of a ratio (Mw/Mn) between the number average molecular weight (Mn) and the weight average molecular weight (Mw) of at least 1.80 and less than 1.90 and the number average molecular weight (Mn) of at least 6,000 and less than 14,000, a high glass transition temperature can be exhibited.

Regarding the Mn and Mw/Mn values of the aromatic polysulfone, as described above, these can be adjusted by controlling each of the reaction conditions including the ratio of the amount used of the dihalogeno compound (A) and the amount used of the dihydric phenol (B) at the time of polymerization, the amount used of the alkali metal salt of carbonic acid, the polycondensation temperature in the second stage and the polymerization time in the second stage. These reaction conditions can be each independently controlled and arbitrarily combined for the purpose of adjusting the Mn and Mw/Mn values of the aromatic polysulfone. Further, the aromatic polysulfone obtained by the above method can be purified or adjusted by a known method, so that a value of a ratio (Mw/Mn) between the number average molecular weight (Mn) and the weight average molecular weight (Mw) is at least 1.80 and less than 1.90, and the number average molecular weight (Mn) is at least 6,000 and less than 14,000.

Since the aromatic polysulfone of the present invention has a high glass transition temperature and excellent heat resistance, it fully exhibits its function even under severe heat treatment conditions. In addition, the aromatic polysulfone of the present invention also exhibits favorable adhesion to materials such as metals, glass and ceramics. Therefore, the aromatic polysulfone of the present invention is suitable, for example, as a coating material for members formed from metals, glass or ceramics or the like. For the coating of the member, for example, a resin composition (hereinafter also referred to as a resin solution) containing an aromatic polysulfone and another resin is prepared, applied to a targeted member and dried, whereby a coating film of the resin can be formed on the surface of the member. However, this is merely an example, and the use of the aromatic polysulfone of the present invention is not limited thereto. The aromatic polysulfone of the present invention is suitable for use in the fields of, for example, automobiles, aircraft and the like.

<Prepreg>

A second aspect of the present invention is a prepreg formed from the aromatic polysulfone of the first aspect of the present invention, a liquid epoxy resin, a curing agent and a reinforcing fiber.

[Epoxy Resin]

The epoxy resin is not particularly limited as long as it is a liquid epoxy resin, and for example, a bisphenol A type epoxy resin, a bisphenol F type epoxy resin, a bisphenol S type epoxy resin or the like can be appropriately used.

The expression "liquid" as used herein means that it is in a liquid state at 0 to 40° C.

[Curing Agent]

The curing agent is not particularly limited as long as it can react with the epoxy resin, but an amine-based curing agent is preferably used. Examples of such curing agents include tetramethylguanidine, imidazole or derivatives thereof, carboxylic acid hydrazides, tertiary amines, aromatic amines, aliphatic amines, and dicyandiamide or derivatives thereof.

[Reinforcing Fiber]

From the viewpoint of strength, the reinforcing fiber is preferably at least one selected from the group consisting of a carbon fiber, a glass fiber and an aramid fiber, and more preferably a carbon fiber. These reinforcing fibers may be woven fabrics or nonwoven fabrics. In addition, the application of the aromatic polysulfone resin of the present invention is not limited thereto, and it can also be used as a coating material for members formed from metals, glass or ceramics or the like.

<Method for Producing Prepreg>

A third aspect of the present invention is a method for producing a prepreg, including a step of impregnating a reinforcing fiber with a mixture obtained by mixing the aromatic polysulfone of the first aspect of the present invention, a liquid epoxy resin and a curing agent.

The method for producing a prepreg is not particularly limited, and a mixture may be prepared by dissolving the aromatic polysulfone of the first aspect of the present invention, the liquid epoxy resin and the curing agent in a solvent such as methyl ethyl ketone, methanol or the like, and the mixture may be impregnated with a reinforcing fiber. As the solvent to be used, in addition to methyl ethyl ketone and methanol, dimethylsulfoxide, N,N-dimethylformamide, N-methylpyrrolidone, dimethylacetamide and the like can be mentioned.

As a method of impregnating the reinforcing fiber with the mixture, a wet method, a hot melt method (also referred to as a dry method) and the like can be mentioned.

The wet method is a method in which a reinforcing fiber is immersed in the mixture, and then the reinforcing fiber is pulled up and the solvent is evaporated from the reinforcing fiber by using an oven or the like, thereby impregnating the reinforcing fiber with the aromatic polysulfone or the like.

The hot melt method is a method of directly impregnating a reinforcing fiber with the mixture reduced in viscosity by heating, or a method in which a film coated with the mixture is produced on a release paper or the like in advance, and then the film is superposed from both sides or one side of the reinforcing fiber, followed by heating and pressurizing, thereby impregnating a reinforcing fiber with a resin.

After impregnating the reinforcing fiber with the epoxy resin and the aromatic polysulfone of the present embodiment in this manner, it is possible to prepare a prepreg by semi-curing the impregnated epoxy resin, for example, through heating to 120 to 140° C.

In the present specification, the expression "semi-cured" means a state in which the viscosity or hardness of the epoxy resin is increased up to a level where a certain shape can be maintained, and refers to a state where the viscosity or hardness may be further increased from the above state.

EXAMPLES

Hereinafter, the present invention will be described in more detail with reference to specific examples. However, the present invention is not limited in any way by the following examples.

It should be noted that in these examples, evaluation of aromatic polysulfones was carried out by measuring physical properties by the following method.

<Measurement of Mn and Mw Values of Aromatic Polysulfone, and Calculation of Mw/Mn Value>

Gel permeation chromatography (GPC) analysis was conducted under the following conditions to measure the Mn and Mw values and calculate the Mw/Mn value. For both Mn and Mw, measurements were made twice, and the average values thereof were determined and taken as Mn and Mw values respectively. Furthermore, the value of Mw/Mn was determined from the Mn and Mw values obtained as the average values.

(Measurement Conditions)

Sample: N,N-dimethylformamide solution of the aromatic polysulfone having a concentration of 0.002 g/mL Sample injection volume: 100 μL Column: Two "TSKgel GMHHR-H" (7.8 mmφ×300 mm) columns, manufactured by Tosoh Corporation, connected in series Column temperature: 40° C.

Eluent: N,N-dimethylformamide

Eluent flow rate: 0.8 mL/minute

Detector: differential refractive index meter (RI)+light scattering photometer (LS)

Standard reagent: polystyrene

<Measurement of Glass Transition Temperature of Aromatic Polysulfone Resin>

Using a differential scanning calorimeter (DSC-50 manufactured by Shimadzu Corporation), the glass transition temperature was calculated by a method in accordance with JIS-K 7121. Approximately 10 mg of the sample was weighed, and the temperature was raised to 340° C. at a rate of temperature increase of 10° C./min, then cooled to 40° C. and raised again to 340° C. at a rate of temperature increase of 10° C./min. From the DSC chart obtained by the second temperature increase, the glass transition temperature was calculated by the method in accordance with JIS-K 7121.

<Production and Evaluation of Aromatic Polysulfone>

Example 1

Bis(4-hydroxyphenyl) sulfone (300.3 g), bis(4-chlorophenyl) sulfone (334.3 g), and diphenyl sulfone (563.3 g) as a polymerization solvent were charged into a polymerization vessel equipped with a stirrer, a nitrogen inlet tube, a thermometer and a condenser attached with a receiver at the tip thereof, and the temperature was raised to 180° C. while causing nitrogen gas to circulate inside the system. Potassium carbonate (161.4 g) was added to the obtained solution, and then the temperature was gradually raised to 305° C. and the reaction was further carried out at 305° C. for 3 hours. The obtained reaction solution was cooled to room temperature and solidified, and following fine crushing, the resultant was washed several times with warm water and a mixed solvent of acetone and methanol, and the powder impregnated with the solvent obtained by filtration was dried by heating at 150° C. to obtain an aromatic polysulfone in the form of a powder. The Mw/Mn value and the glass transition temperature of the obtained aromatic polysulfone are shown in Table 1.

Example 2

Bis(4-hydroxyphenyl) sulfone (300.3 g), bis(4-chlorophenyl) sulfone (334.3 g), and diphenyl sulfone (563.3 g) as a polymerization solvent were charged into a polymerization vessel equipped with a stirrer, a nitrogen inlet tube, a thermometer and a condenser attached with a receiver at the tip thereof, and the temperature was raised to 180° C. while causing nitrogen gas to circulate inside the system. Potassium carbonate (161.4 g) was added to the obtained solution, and then the temperature was gradually raised to 300° C. and the reaction was further carried out at 300° C. for 3 hours. The obtained reaction solution was cooled to room temperature and solidified, and following fine crushing, the resultant was washed several times with warm water and a mixed solvent of acetone and methanol, and the powder impregnated with the solvent obtained by filtration was dried by heating at 150° C. to obtain an aromatic polysulfone in the form of a powder. The Mw/Mn value and the glass transition temperature of the obtained aromatic polysulfone are shown in Table 1.

Comparative Example 1

Bis(4-hydroxyphenyl) sulfone (300.3 g), bis(4-chlorophenyl) sulfone (331.8 g) and diphenyl sulfone (563.3 g) as a polymerization solvent were charged into a polymerization vessel equipped with a stirrer, a nitrogen inlet tube, a thermometer and a condenser attached with a receiver at the tip thereof, and the temperature was raised to 180° C. while causing nitrogen gas to circulate inside the system. Potassium carbonate (160.5 g) was added to the obtained solution, and then the temperature was gradually raised to 290° C. and the reaction was further carried out at 290° C. for 3 hours. The obtained reaction solution was cooled to room temperature and solidified, and following fine crushing, the resultant was washed several times with warm water and a mixed solvent of acetone and methanol, and the powder impregnated with the solvent obtained by decantation and filtration was dried by heating at 150° C. to obtain an aromatic polysulfone in the form of a powder. The Mw/Mn value and the glass transition temperature of the obtained aromatic polysulfone are shown in Table 1.

TABLE 1

| | Mn | Mw | Mw/Mn | Glass transition temperature (° C.) |
|---|---|---|---|---|
| Example 1 | 9,200 | 17,100 | 1.87 | 215 |
| Example 2 | 9,100 | 16,600 | 1.83 | 215 |
| Comparative Example 1 | 10,400 | 18,300 | 1.75 | 213 |

As is apparent from Table 1, the aromatic polysulfones of Examples 1 and 2 had higher glass transition temperatures and excellent heat resistance, as compared with those of Comparative Example 1.

INDUSTRIAL APPLICABILITY

The present invention can be used in the field of materials requiring high heat resistance, such as coating materials for materials such as metals, glass, ceramics and the like, and is therefore extremely useful industrially.

The invention claimed is:

1. An aromatic polysulfone which is a thermoplastic aromatic polysulfone obtained by polymerizing a dihalogeno compound (A) represented by a formula (A) and a dihydric phenol (B) represented by a formula (B), wherein a value of a ratio (Mw/Mn) between a number average molecular weight (Mn) and a weight average molecular weight (Mw) is at least 1.80 and less than 1.90, the number average molecular weight (Mn) is at least 6,000 and less than 9,200, and the glass transition temperature of the aromatic polysulfone is 215° C. or higher and 235° C. or lower;

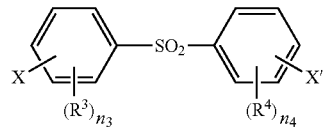 (A)

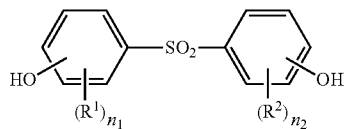 (B)

wherein in the formulas (A) and (B), each of X and X' independently represents a halogen atom;

each of $R^1$, $R^2$, $R^3$ and $R^4$ independently represents an alkyl group having 1 to 4 carbon atoms or an alkoxy group having 1 to 4 carbon atoms;

each of $n_1$, $n_2$, $n_3$ and $n_4$ independently represents an integer of 0 to 4; and when $n_1$, $n_2$, $n_3$ or $n_4$ is an integer of 2 to 4, a plurality of $R^1$, $R^2$, $R^3$ or $R^4$ groups may be the same or different from each other.

2. The aromatic polysulfone according to claim 1, wherein in the formula (A), X and X' are chlorine atoms.

3. The aromatic polysulfone according to claim 1, wherein in said formula (A) or said formula (B), $n_1$, $n_2$, $n_3$ and $n_4$ are 0.

4. A prepreg formed from the aromatic polysulfone according to claim 1, a liquid epoxy resin, a curing agent and a reinforcing fiber.

5. A method for producing a prepreg, comprising a step of impregnating a reinforcing fiber with a mixture obtained by mixing the aromatic polysulfone according to claim 1, a liquid epoxy resin and a curing agent.

* * * * *